(12) United States Patent
Schauser

(10) Patent No.: US 6,522,334 B2
(45) Date of Patent: Feb. 18, 2003

(54) METHOD AND APPARATUS FOR PROVIDING REMOTE ACCESS, CONTROL OF REMOTE SYSTEMS AND UPDATING OF DISPLAY INFORMATION

(75) Inventor: Klaus E. Schauser, Goleta, CA (US)

(73) Assignee: Expertcity.com, Inc., Santa Barbara, CA (US)

(*) Notice: Subject to any disclaimer, the term of this patent is extended or adjusted under 35 U.S.C. 154(b) by 0 days.

(21) Appl. No.: 09/922,018

(22) Filed: Aug. 2, 2001

(65) Prior Publication Data

US 2002/0000990 A1 Jan. 3, 2002

Related U.S. Application Data

(63) Continuation of application No. 09/301,022, filed on Apr. 28, 1999, now Pat. No. 6,331,855.

(51) Int. Cl.[7] .......................... G06F 15/16; G06F 13/00
(52) U.S. Cl. ..................................... 345/503; 345/537
(58) Field of Search ............................... 345/503, 537, 345/545, 556, 564

(56) References Cited

U.S. PATENT DOCUMENTS

| | | | |
|---|---|---|---|
| 4,538,993 A | 9/1985 | Krumholz | |
| 4,622,545 A | 11/1986 | Atkinson | |
| 4,823,108 A | 4/1989 | Pope | |
| 4,949,248 A | 8/1990 | Caro | |
| 5,086,402 A | * 2/1992 | Sterling, II | 709/246 |
| 5,241,625 A | 8/1993 | Epard et al. | |
| 5,255,361 A | * 10/1993 | Callaway et al. | 345/502 |
| 5,446,888 A | 8/1995 | Pyne | |
| 5,491,511 A | 2/1996 | Odle | |
| 5,491,780 A | * 2/1996 | Fyles et al. | 345/733 |
| 5,598,521 A | 1/1997 | Kilgore et al. | |
| 5,689,639 A | * 11/1997 | Schwarz | 341/51 |
| 5,721,907 A | 2/1998 | Pyne | |
| 5,790,796 A | 8/1998 | Sadowsky | |
| 5,790,977 A | 8/1998 | Ezekiel | |
| 5,796,566 A | 8/1998 | Sharma | |
| 5,802,530 A | 9/1998 | Van Hoff | |
| 5,805,442 A | 9/1998 | Crater et al. | |
| 5,831,639 A | * 11/1998 | Conticello | 345/2.2 |
| 5,898,834 A | * 4/1999 | Sharpe et al. | 709/201 |
| 5,913,920 A | * 6/1999 | Adams et al. | 345/753 |
| 5,990,852 A | * 11/1999 | Szamrej | 345/2.1 |

* cited by examiner

*Primary Examiner*—Ulka J. Chauhan
(74) *Attorney, Agent, or Firm*—Blakely Sokoloff Taylor & Zafman LLP

(57) ABSTRACT

The present invention is a system and method for controlling information displayed on a first processor-based system, from a second processor-based system. The apparatus comprises a memory to store instruction sequences by which the second processor-based system is processed, and a processor coupled to the memory. The stored instruction sequences cause the processor to: (a) examine, at a predetermined interval, a location of a currently displayed image; (b) compare the location with a corresponding location of a previously displayed image to determine if the previously displayed image has changed; (c) transmitting location information representing the change; and (d) storing the changed information on the first processor-based system. Various embodiments are described.

24 Claims, 9 Drawing Sheets

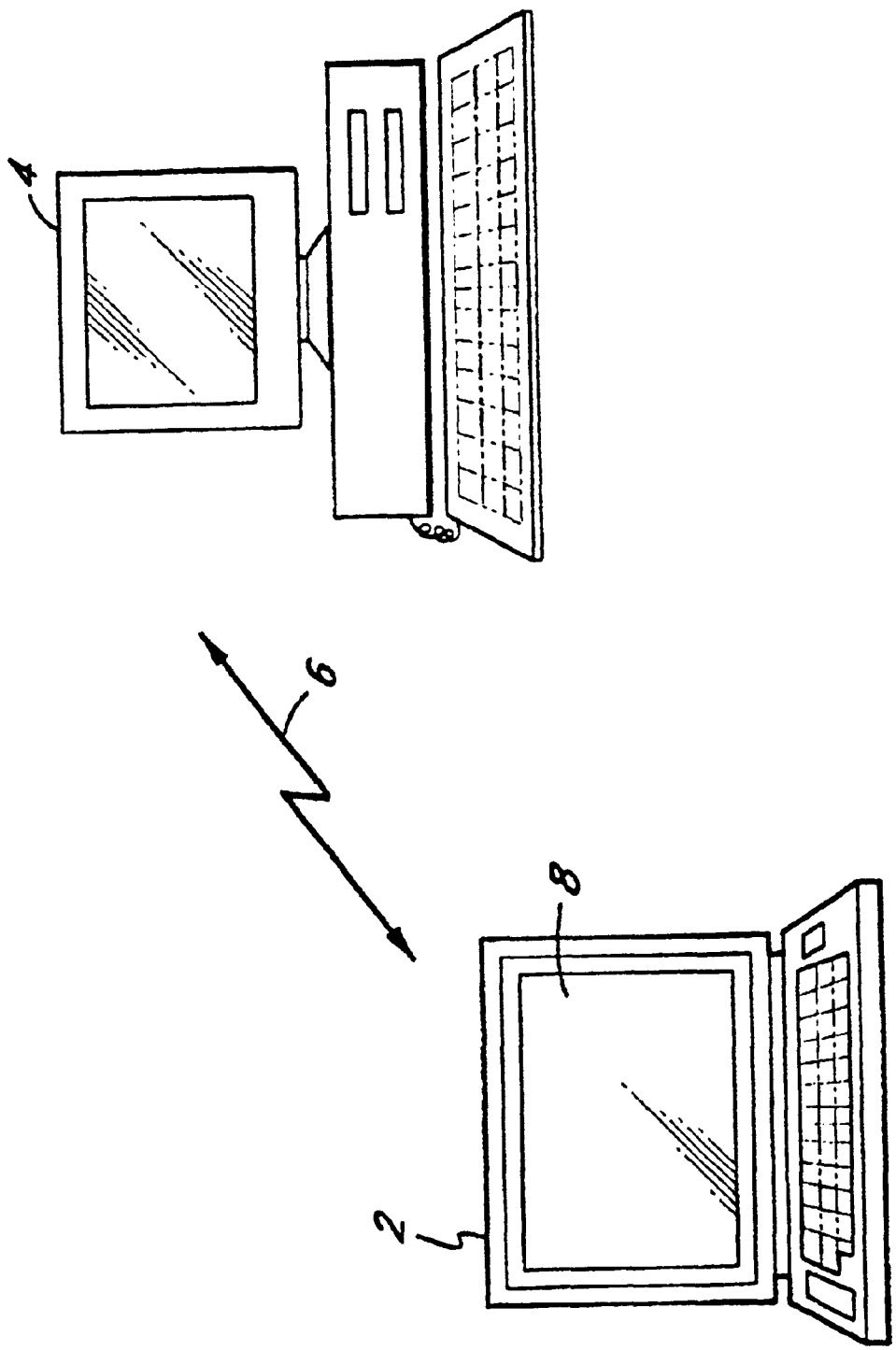

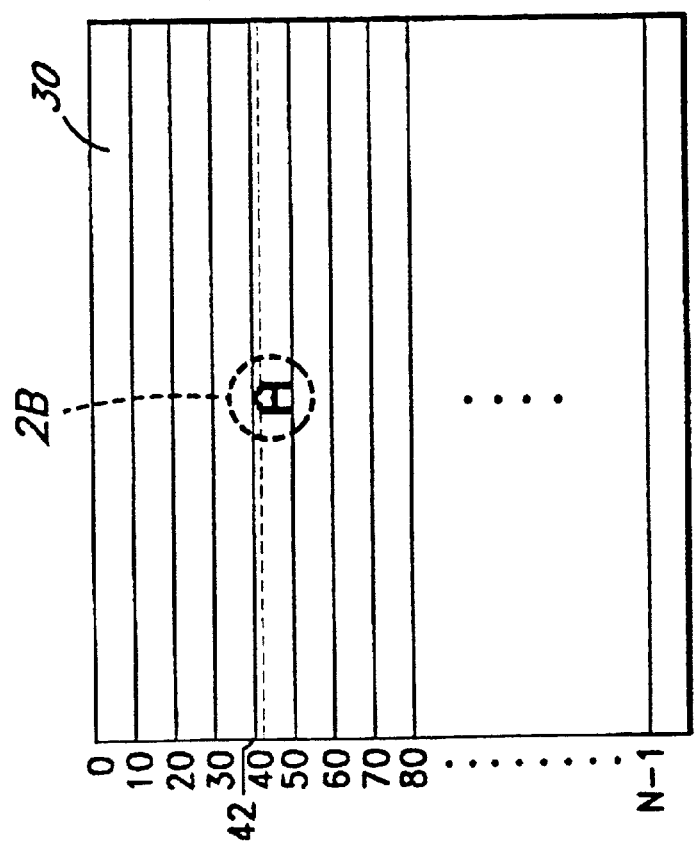
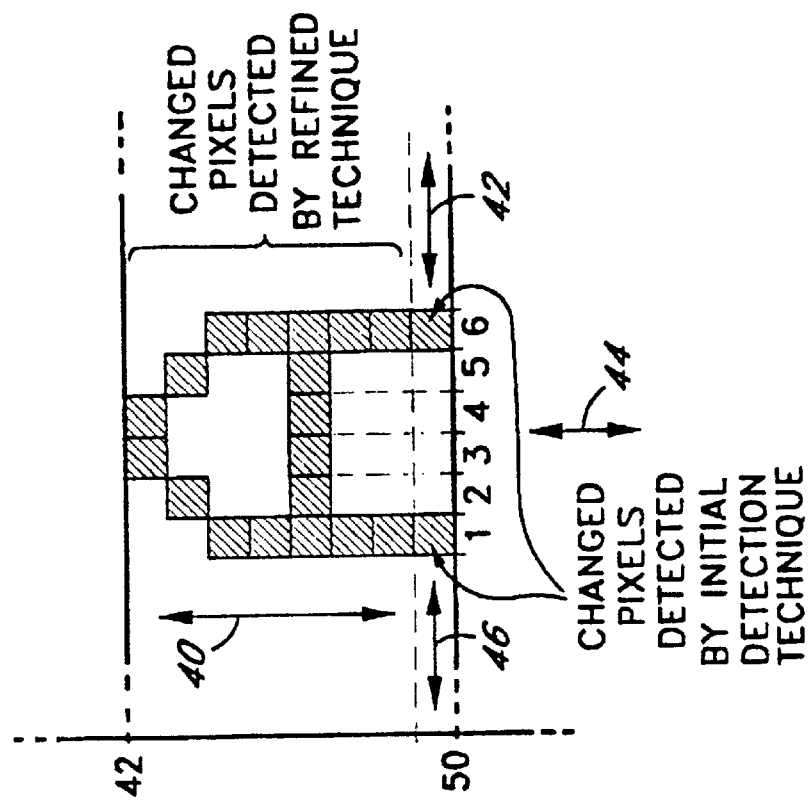

METHOD AND APPARATUS FOR PROVIDING REMOTE ACCESS, CONTROL OF REMOTE SYSTEMS AND UPDATING OF DISPLAY INFORMATION

This is a continuation of U.S. patent application Ser. No. 09/301,022 filed Apr. 28, 1999, which has now matured to U.S. Pat. No. 6,331,855.

BACKGROUND OF THE INVENTION

1. Field of the Invention

The present invention relates in general to processor-based systems, and more particularly, to an apparatus and method for remote access and control of remote systems in a network and updating of display information on remote systems.

2. Description of the Related Art

Remote desktop access technology allows a user to control a remote computer as if sitting right in front of it. The user can run applications, access files, change configurations, or debug problems. There are many different uses for such technology, including providing technical support, telecommuting, collaboration, education and training, equipment control, software and computer rental, software demonstration, sales presentations, and access from mobile handheld devices.

Most remote control packages consist of two software components: a program running on the remote computer (the host) and a program running on the local computer (the client). Most existing remote control packages work by replacing device drivers on the host and requires both the host and client components to be preinstalled before the software can be used. Users of existing remote control programs are routinely frustrated with difficulty in installation and use and incompatibility with other applications (e.g., most remote control packages interfere with one another). Technical support providers find the present attempts at remote access very cumbersome because they cannot be used unless they are pre-installed and already running on the customer's machine. In addition, most existing tools have a large code size and require re-booting before use, making them unsuitable for on-demand downloading and dynamic installation. Finally, most offer only limited cross platform solution.

As discussed, conventional remote access and updating systems typically require specific client and server software to be installed prior to use. To determine if updating is required, the server typically intercepts output events such as graphics calls either at the library or device driver level. These events are typically transported to the client computer where they are reinterpreted. Alternatively, the effects of the event, such as the graphics output, are captured as a bitmap on the server and then transported to the client computer.

For example, U.S. Pat. No. 5,241,625 discloses a system for remotely controlling information displayed on a computer screen by intercepting output events such as graphics calls. Graphics commands which drive a computer window system are captured and saved as a stored record or sent to other computers. A message translation program translates the captured messages for playback on a designated computer.

U.S. Pat. No. 5,796,566 discloses a system in which sequences of video screens forwarded from a host CPU to a video controller, are stored and subsequently retrieved by a terminal located remote from the host CPU. In particular, display data is captured in a local frame buffer which stores the display data frame by frame. A previous frame or screen of display data is compared with a current frame or screen of display data to determine if a change has occurred. The change is then stored. Three types of changes are typically stored: a sequence of video screen changes which occur prior to server failure or reset; a sequence of video screen changes which occur after the most current server reset, and a sequence of video screen changes which occur after a reset that occurred prior to the most recent reset. The stored changes are used to determine reasons for server failure or possibilities of future failures.

U.S. Pat. No. 5,790,977 discloses a method for providing remote access from a remote host system to an instrument. Control and data acquisition software is stored in the instrument. The control and data acquisition software is forwarded to the remote host system in response to the remote host system. Data acquisition of the instrument is controlled in response to control commands from the control and data acquisition software running on the remote host system. Acquired data is forwarded from the instrument to the remote host system in response to a request from the remote host system.

The techniques employed by conventional remote access and updating systems involve high overhead in terms of complexity in implementation and installation. In addition, the requirement for specific software limits the access and application of the remote access and updating system.

Accordingly, there is a need in the technology for an apparatus and method for providing remote access and control of remote systems in a network and updating of display information on remote systems, which avoids the aforementioned problems.

BRIEF SUMMARY OF THE INVENTION

The present invention is a system and method for controlling information displayed on a first processor-based system, from a second processor-based system. The system comprises a memory to store instruction sequences by which the second processor-based system is processed, and a processor coupled to the memory. The stored instruction sequences cause the processor to: (a) examine, at a predetermined interval, a location of a currently displayed image; (b) compare the location with a corresponding location of a previously displayed image to determine if the previously displayed image has changed; (c) transmitting location information representing the change; and (d) storing the changed information on the first processor-based system. Various embodiments are described.

BRIEF DESCRIPTION OF THE DRAWINGS

FIG. 1A is a system block diagram of an exemplary processor system in which the apparatus and method of the present invention is used.

FIG. 2A illustrates a display system in which one embodiment of the detection technique of the present invention is utilized.

FIG. 2B illustrates one embodiment of a technique for determining the extent of an update or change of information displayed on a screen.

DETAILED DESCRIPTION OF THE PREFERRED INVENTION

Figure 1B:
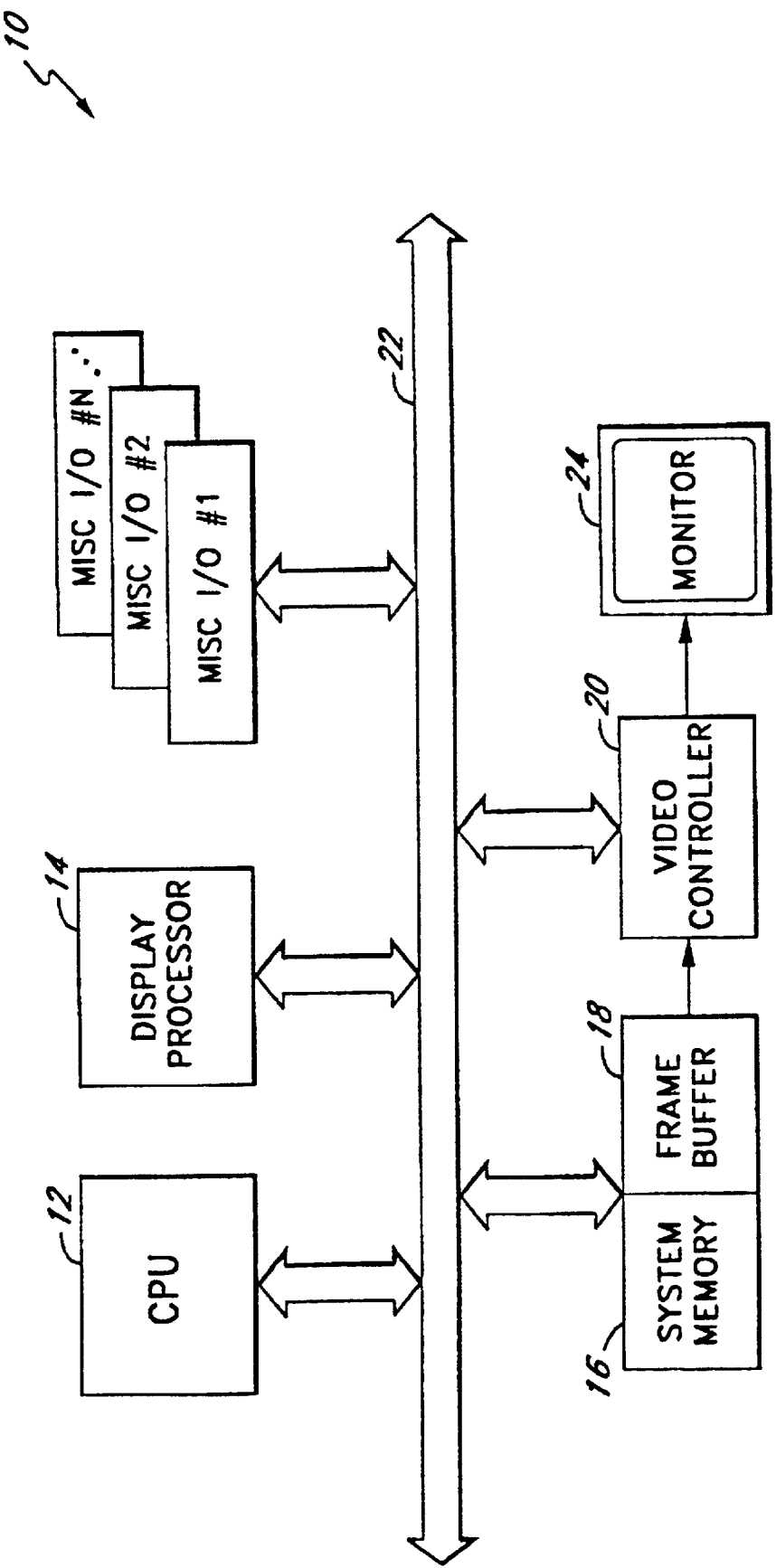
FIG. 1B illustrates an exemplary processor system 10 which implements the processes of the present invention.

The present invention provides thin-client, thin-host software space for remote desktop access and collaborative work. It enables easy, on-demand access to any computer wherever and whenever needed through all types of terminals, including Java-enabled Web browsers. The host software is a very small executable that can be downloaded and started through any web browser. Because it does not replace any device drivers, but rather, polls the screen for any changes, it can be started without requiring a re-boot and does not introduce any incompatibilities with other running programs. Similarly, the client software is also a very small software program, which can also be implemented as a small downloadable Java applet. The size of the client and host software is such that both can be downloaded quickly over a low-bandwidth internet connection.

Due to the small size and lack of incompatibilities, the software provided by the present invention is very well suited for technical support. All that is required for a technical support engineer to help a customer is for both to point their browser to a web site that contains the software. The customer quickly downloads the host software, the support engineer downloads the client applet, the connection is automatically established and the support engineer can help the customer as if sitting right next to him. The host sends the desktop image to the client, which then displays the host desktop inside the browser window. The client forwards any keyboard or mouse input to the host, which responds to them just as if they were made directly on the host machine. Any changes on the host desktop can be seen in the client browser window. Thus it is possible to transparently work from any client on the remote host. In fact, multiple clients can connect simultaneously to the host for collaborative purposes.

The software of the present invention can be used in a collaborative setting, which allows multiple persons to simultaneously operate on the same document and allows people to quickly exchange graphical information without regards to platform. In that regard, the operating system running on the processing system 2 or 4 may be any processing system, including, but not limited to Windows™ 95, Windows™ 98, Unix, Lynix, Solaris, etc. Similarly, it can be used in an educational and training setting, where it can be used to train users on high-end software (e.g. graphical or statistical packages) especially those requiring expensive machines or rare training talent.

FIG. 1A illustrates an exemplary system that implements the technique(s) of the present invention. As shown, a source processing system 2 communicates with a remote processing system 4 via a communication or transportation medium 6. Either of the source or remote processing systems 2 or 4 may implement the detection and updating technique(s) of the present invention. However, for present discussion purposes, only the source processing system 2 will be referred to as implementing the detection and updating technique(s) of the present invention. Upon detection of changes to the desktop 8 of the source processing system 2, the source processing system 2 forwards the detected changes to the remote processing system 4 via the communication or transportation medium 6. The communication or transportation medium 6 may be any communication or transportation medium, such as a network, telephone line, etc.

The present embodiment is described in reference to a processor system 10. FIG. 1B illustrates an exemplary processor system 10 which implements the processes of the present invention. The processor system 10 may be implemented in either of the source processing system 2 or the remote processing system 4. The processor system 10 comprises a CPU 12, a display processor 14, a system memory 16, a frame buffer 18 and a video controller 20. The system memory 16 includes random access memory (RAM) and read-only memory (ROM). In one embodiment, the system memory 16 also includes a main memory or a dynamic random access memory (DRAM). The CPU 12, display processor 14, system memory 16, frame buffer 18 and video controller 20 are coupled to a system bus 22. The processor system 10 may also include various I/O and peripheral modules (MISC I/O #1, #2, . . . #N) which are coupled to the system bus 22. Examples of the I/O modules include a disk drive, a console, a printer and a mouse. The video controller 22 is in turn coupled to a monitor 24. In one embodiment, the processor system 10 may further be coupled to a network.

The system memory 16 contains data and programs that typically execute on the CPU 12, such as the application program, graphics package and the operating system. In one embodiment, the system memory 16 also contains data and programs that perform scanning and/or graphical operations. In alternate embodiments, the processing system 10 may comprise a separate display processor memory (not shown) coupled to the display processor 14, which contains data and the programs that perform scanning and/or graphical operations. The frame buffer 18 contains the displayable image created by the scanning and/or graphical operations. The architecture shown in FIG. 1B enables both the CPU 12 and the display processor 14 to access any part of memory in a uniform and homogeneous manner. It is understood however, that the present invention may be implemented in processing systems that have different architectures.

For example, the invention may be implemented in a processing system without a display processor 14. In this case, the application program and the graphics subroutine package share the system memory 16 and are executed by the CPU 12. The application program and/or the graphics subroutine package may also be provided via the miscellaneous I/O devices #1 to #N. For example, the application program and/or the graphics subroutine package may be located on a computer readable medium such as a floppy disk, a compact disk, a digital video disk and a magneto-optical storage disk. However, to provide a system with higher performance than a single-CPU system, the invention may be implemented on one of the following systems: (1) one with a co-processor that shares the system bus with the main CPU; (2) a display processor that either shares the system bus and system memory or a display processor that has its own bus and memory system; (3) integrated processors containing internal hardware support for graphics operations. For present discussion purposes, the system of FIG. 1B will be referred to.

In implementing the present invention, the CPU 12 determines if there are changes or updates to the information displayed on the display screen or desktop, such as desktop 8 (FIG. 1A) of a source computer 2. This is accomplished by polling the desktop at a predetermined interval to determine if there are changes to the image displayed on the desktop using any one or a combination of the techniques discussed below. In one embodiment, the CPU 12 polls portion of the desktop every 10 milliseconds.

The CPU 12 may poll a particular line, or a portion (or portions) of a particular line or area, as described in detail below. The portion (or portions) may be predetermined portions, statistically determined portions or arbitrarily determined portions. For example, the CPU 12 may poll a number of subregions (tiles) or lines of the screen, to determine if a change has occurred. In that regard, the subregions (tiles) or lines may be predetermined location(s), statistically determined location(s) or arbitrarily determined location(s). In particular, each frame of pixels that are currently displayed are stored in the frame buffer 18, while the pixels representing a previously displayed image, for example, the last updated image, are stored in system memory 16. The technique(s) of the present invention compares a portion of the currently displayed image to a corresponding portion of a previously displayed image to determine if changes have occurred. If so, the changes are stored and/or forwarded to the remote computer 4 (FIG. 1A).

Alternatively, the checksum for a whole line or a portion of a line under examination may be computed. It is then compared to a previously computed checksum for the same line or portion of line. Thus, if there is a change on the line (or portion of the line), the checksum also changes. Accordingly, when compared to a previously computed checksum, the change on the line (or portion thereof) will be reflected in terms of a different checksum for the same line (or portion of line) under examination. The line or portion of line may be a predetermined location, a statistically determined location or an arbitrarily determined location.

In one embodiment, the changes are displayed on the display screen of the remote computer 4. In an alternate embodiment, the source computer 2 is either not connected to a display screen or has a display screen that is not activated. The remote computer 4 receives the changes forwarded by the source computer 2 and subsequently updates the pixels in its frame buffer. In this embodiment, the source computer 2 operates as if it has a virtual screen, and the changes are displayed on the display screen of the remote computer 4. In a further alternative embodiment, the source computer 2 may have multiple virtual screens to which one can connect from multiple destination processors.

In one embodiment, the software and data executed by the CPU 12 is stored in the system memory 16. In an alternate embodiment, the software and data executed by the CPU 12 is located on a machine-readable medium provided via one of the I/O modules I/O #1, . . . , #N.

FIG. 2A illustrates a display system in which one embodiment of the detection technique of the present invention is utilized. In this detection technique, the CPU 12 polls the desktop 30 by examining every predetermined line, or a portion of every predetermined line, of the currently displayed image on the desktop 30 at a predetermined interval, such as every 10 ms. For example, the CPU 12 may first examine an Xth line (or a portion of the Xth line) where X is an integer, and then proceed to examine every (X+AK)th line (or a portion of every (X+AK)th line) where K is a predetermined integer from 0 through N−1, where N is the number of displayable lines on the display screen or desktop 30. That is, every Xth and then (X+AK)th line is examined, where K is a fixed integer and A is a variable integer, from 0, 1, 2, 3, . . . ((N−1)/K). For example, if K=10, X=0, the CPU 12 first examines line 0 (or a portion of line 0), and compares the examined line 0 with a corresponding line in a previously stored image. In one embodiment, the previously stored image is the most recently updated image. If no change is detected, the CPU 12 proceeds to examine the next (X+AK)th line (or the same portion of the next (X+AK)th line), which in the present case, is the 10th line. The examination-and-comparison technique is continued until a change is detected, or until the last (X+AK)th line (or the same portion of the last (X+AK)th line) is reached.

At that juncture, the CPU 12 may select another value of X and/or K for examination. To continue with the example used above, if K=10, and X is selected to be 5, then every 5th, 15th, 25th, . . . etc, lines are examined. If no change is detected, the CPU 12 proceeds to select another value of X, for example X=2, and then proceed to examine the next (2+10A)th line in the same manner as described above, until every line on the desktop 30 is examined (in the order 2, 12, 22, 32 . . .) and compared with the previously displayed image, or until a change has been detected.

If a change has been detected, the CPU 12 determines the exact extent of the change. FIG. 2B illustrates one embodiment of a technique for determining the extent of the update on a display screen. In FIG. 2B, a letter "A" which is 8 lines high and located between lines 42 and 50, has been determined to be an update to the previously displayed image. For example, the bottom portion of "A" had been detected using the technique described above, during examination of the 50th line. Upon detecting this change using the previous technique, the CPU 12 determines the left and right boundaries of the detected change. In the present example, the detected change occupies 6 pixels in width. The CPU 12 then proceeds to examine a predetermined number of pixels surrounding the detected change, for example, 20 pixels to the left, right, top and bottom of the detected change (i.e., from changed pixels 1–6), as illustrated by arrows 40, 42, 44 and 46, to determine the entirety of the change. The detected change(s) are then stored and/or communicated to the remote processing system 4 (FIG. 1A).

Figure 3:
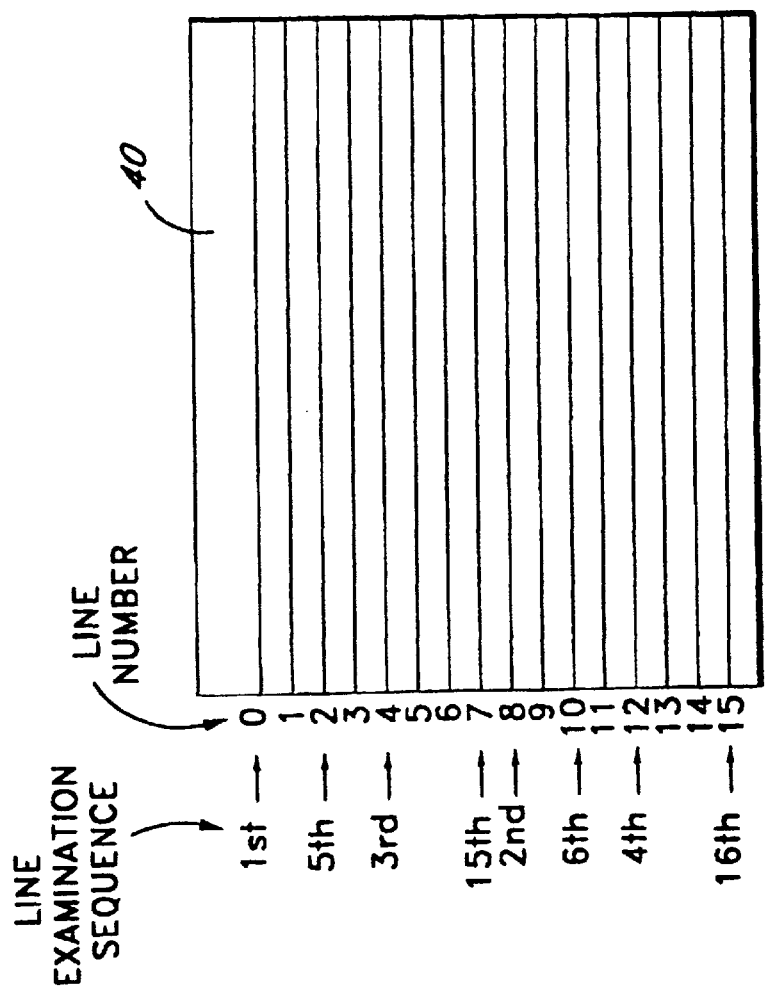
FIG. 3 illustrates a display system that implements a second embodiment of the detection technique of the present invention.

FIG. 3 illustrates a display system that implements a second embodiment of the detection technique of the present invention. In this alternate embodiment, the CPU 12 implements a recursive bisection technique to divide the desktop into smaller portions to facilitate detection of updates or changes to the desktop. In particular, for i=0 to n−1, where i is a line number of each line or portion of a line on the display screen 8, each line or portion thereof is examined in an order as follows:

For i=0 to n−1
   checkline (bit_reverse i)
   where the function bit_reverse operates to reverse the binary representation of i. For example, if n=16, the following occurs:

TABLE 1

| i | bit representation | bit source | line examined |
|---|---|---|---|
| 0 | 0000 | 0000 | 0 |
| 1 | 0001 | 1000 | 8 |

TABLE 1-continued

| i | bit representation | bit source | line examined |
|---|---|---|---|
| 2 | 0010 | 0100 | 4 |
| 3 | 0011 | 1100 | 12 |
| 4 | 0100 | 0010 | 2 |
| 5 | 0101 | 1010 | 10 |
| . | | | |
| . | | | |
| . | | | |
| 14 | 1110 | 0111 | 7 |
| 15 | 1111 | 1111 | 15 |

For example, for a display screen with a total number of lines that is a power of two, the CPU 12 examines the lines in an order corresponding to a reverse bit numbering process. In particular, if there are N-1 display lines on the desktop, the CPU 12 examines the lines in a reverse binary bit representation. That is, the CPU 12 bisects the desktop into half and examines the zeroth and middle lines of the desktop. For example, if N=16, then the 0th line of the desktop is examined, followed by the 8th line. If no changes are detected, it then bisects the top half of the desktop and examines the middle line of the top half. In this example, line 4 is examined. If no changes are detected, the CPU 12 bisects the bottom half of the desktop and examines the middle line of the bottom half. In the example used, line 12 is next examined. If no changes are detected, the CPU 12 bisects the top portion of the top half, and examines the corresponding middle line, etc. For example, if N=16, the CPU 12 examines the lines an order as follows: 0, 8, 4, 12, 2, 10, . . . , 7 and 15, as shown in the table above. This process is continued until a change has been detected or until all display lines have been examined. If no changes are detected, the CPU 12 polls a portion of the desktop at the next predetermined time. Otherwise, the refined detection process of FIG. 2B and as described in the corresponding text, is implemented.

Figure 4:
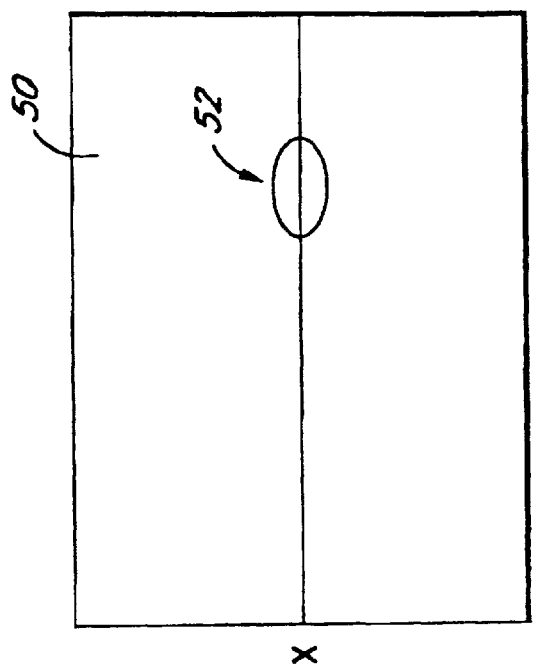
FIG. 4 illustrates a display system that implements a third embodiment of the detection technique of the present invention.

FIG. 4 illustrates a display system which implements a third embodiment of the detection technique of the present invention. In this alternate embodiment, the CPU 12 keeps a record of the location of the most recent changes, and proceeds to examine those locations more frequently. For example, as shown in FIG. 4, location 52 on the displayed image 50 has been determined to be the location of the most recent and frequent updates. Such determination may be based the occurrence of a predetermined number of changes within a predetermined period of time. In one embodiment, the location 52 involves a relatively small number of lines that have undergone changes recently. The CPU 12 round robins through the location 52 and compares the region (i.e., pixels located in the location 52) to determine if further changes have occurred. This technique may be used alone or in combination with either of the above-discussed techniques to determine if changes have occurred. Such a technique has been found to provide excellent results when a user is typing characters on a single line in a text editor. The technique has also been found to work well when examining regions in which constant updating occurs, e.g., at the location of a blinking cursor.

In an alternate embodiment, the CPU 12 monitors input/output device activity, such as keyboard or mouse activity. This technique is based on the assumption that a change will very likely occur close the location of a most recent change involving an input/output device activity, such as a keyboard entry event. In the case of a mouse activity, there is typically a correlation between updates and a mouse activity or the current mouse position. For example, it is likely that the image is changing due to a mouse-related event. Such mouse-related events include the movement of the ball under mouse (e.g., relocation of position), the clicking of various buttons (e.g., to select menu items) on the mouse or the dragging of the mouse (e.g., resizing of items).

Figure 5:
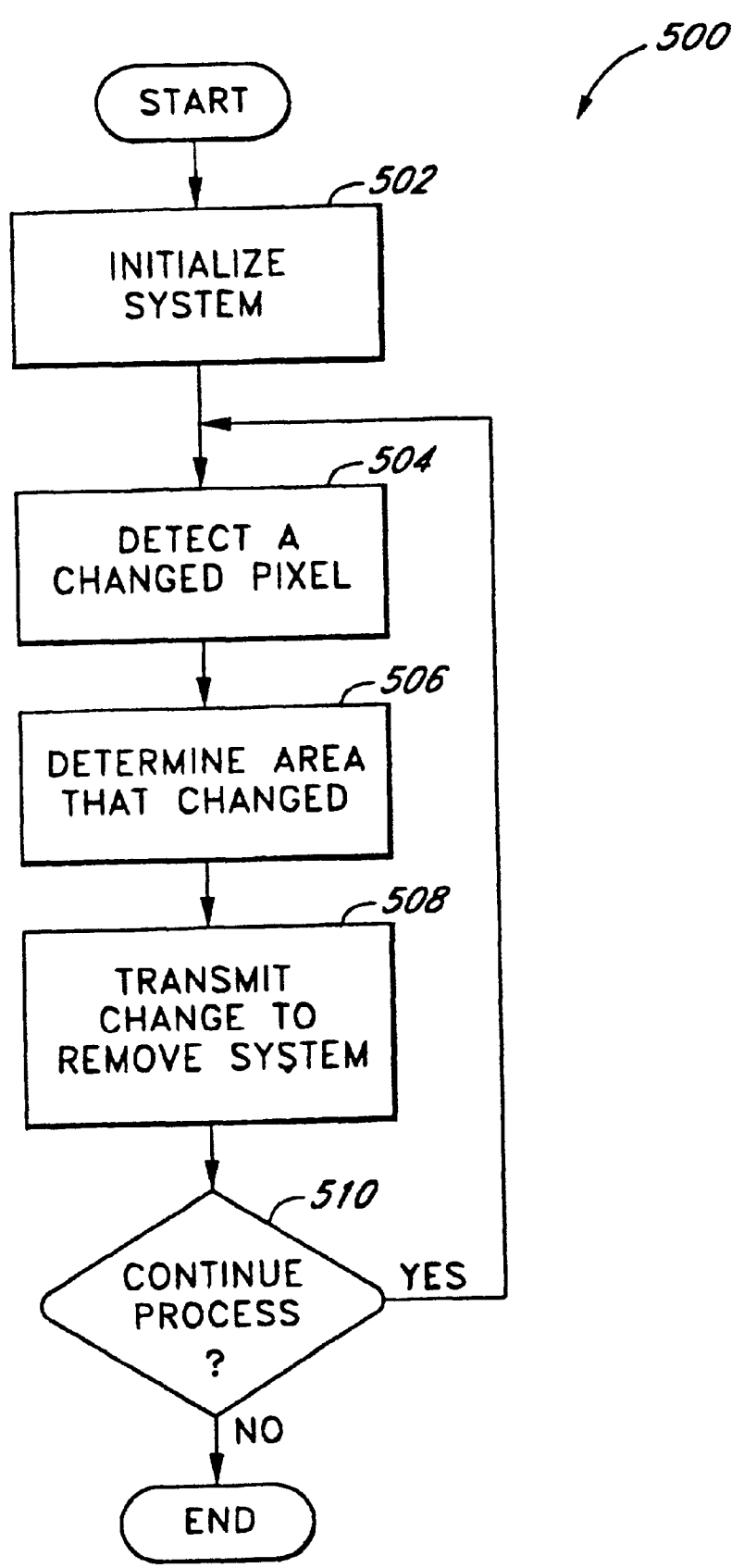
FIG. 5 is a flow chart illustrating one embodiment of the overall detection, control and updating process of the present invention.

FIG. 5 is a flow chart illustrating one embodiment of the overall detection and updating process of the present invention. Commencing from a start state, the process 500 advances to process block 502, where initialization occurs. The process 500 then proceeds to process block 504, where it detects a changed pixel. When such detection occurs, the process 500 determines the extent of the change or update by determining the area of the change, as shown in process block 506. Once determined, the process 500 transmits the change to the remote system, as shown in process block 508. The process 500 then queries if it should continue with the detection and updating process, as shown in decision block 510. If so, the process 500 returns to process block 504. Otherwise, the process 500 terminates.

Figure 6:
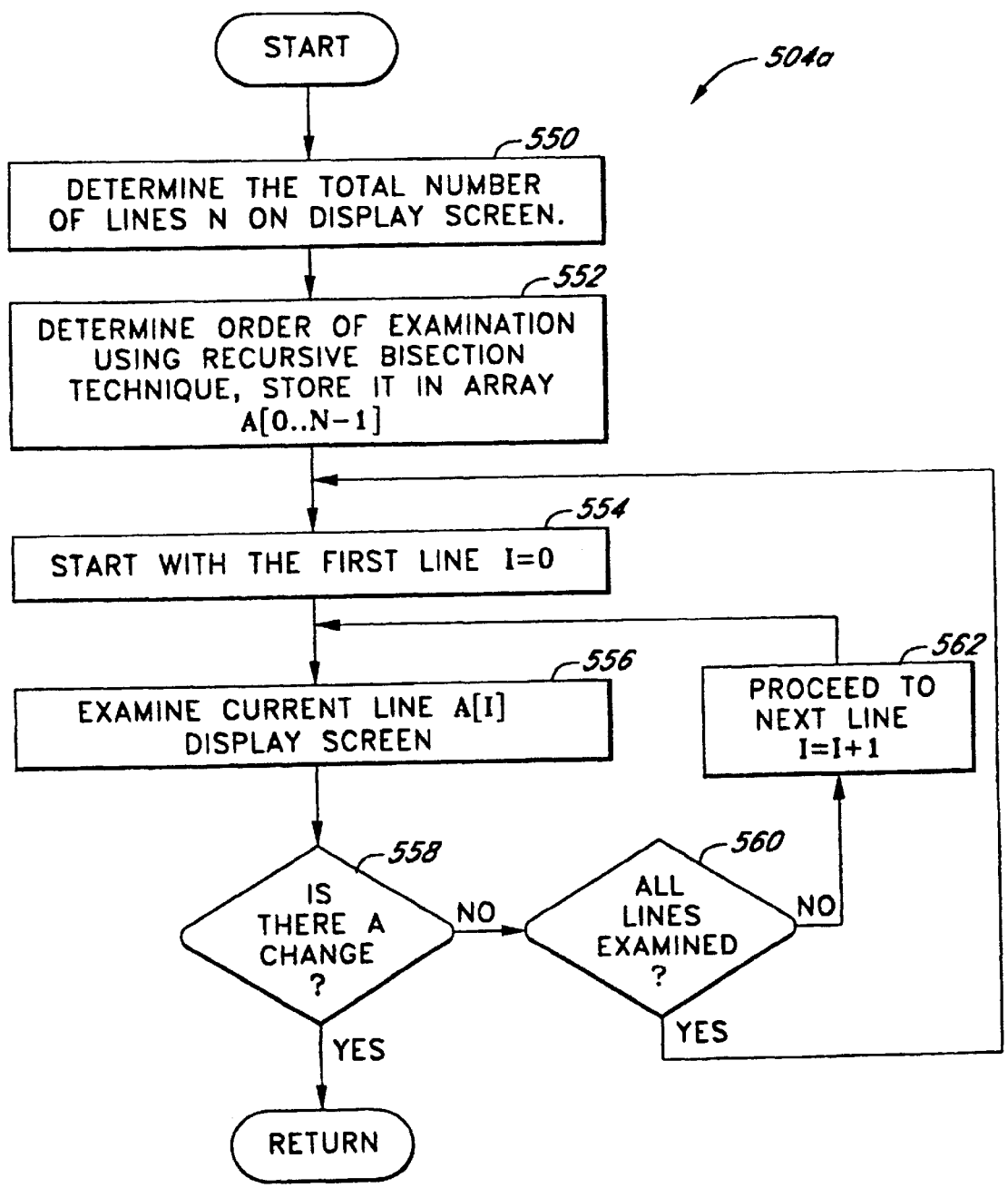
FIG. 6 is a flow chart illustrating one embodiment of the detection process of the present invention.

FIG. 6 is a flow chart of one embodiment of the detection process 504 of FIG. 5. In the present embodiment, the detection process 504 may be implemented using the recursive bisection detection process 504a. Beginning from a start state, the process 504a proceeds to process block 550, where it determines the total number of lines N on the display screen. The process 504a then determines the order of examination using the recursive bisection technique, as described earlier, and the order is stored in an array A[I] where I=0, . . . , N-1, as shown in process block 552. The process 504a then advances to process block 554, where it begins the examination process with the first line of the array A[I], i.e., I=0. The process 504a then proceeds to examine current line in the array A[I], in the order previously determined, as shown in process block 556. After examining each line, the process 504a queries if there is a change, as shown in decision block 558. In one embodiment, this is accomplished by comparing the currently displayed line with a corresponding line in a previously stored image. In a further embodiment, the previously stored image is a most recently updated image. If there is a change, the process 504a returns to process block 506 of the main process 500 as shown in FIG. 5. Otherwise, it proceeds to decision block 560, where it queries if all the lines have been examined. If so, it returns to process block 554, where it continues with another round of the detection process 504a. Otherwise, it proceeds to process block 562, where it proceeds to the next line in the array, i.e., I=I+1, to continue with the current detection process.

Figure 7:
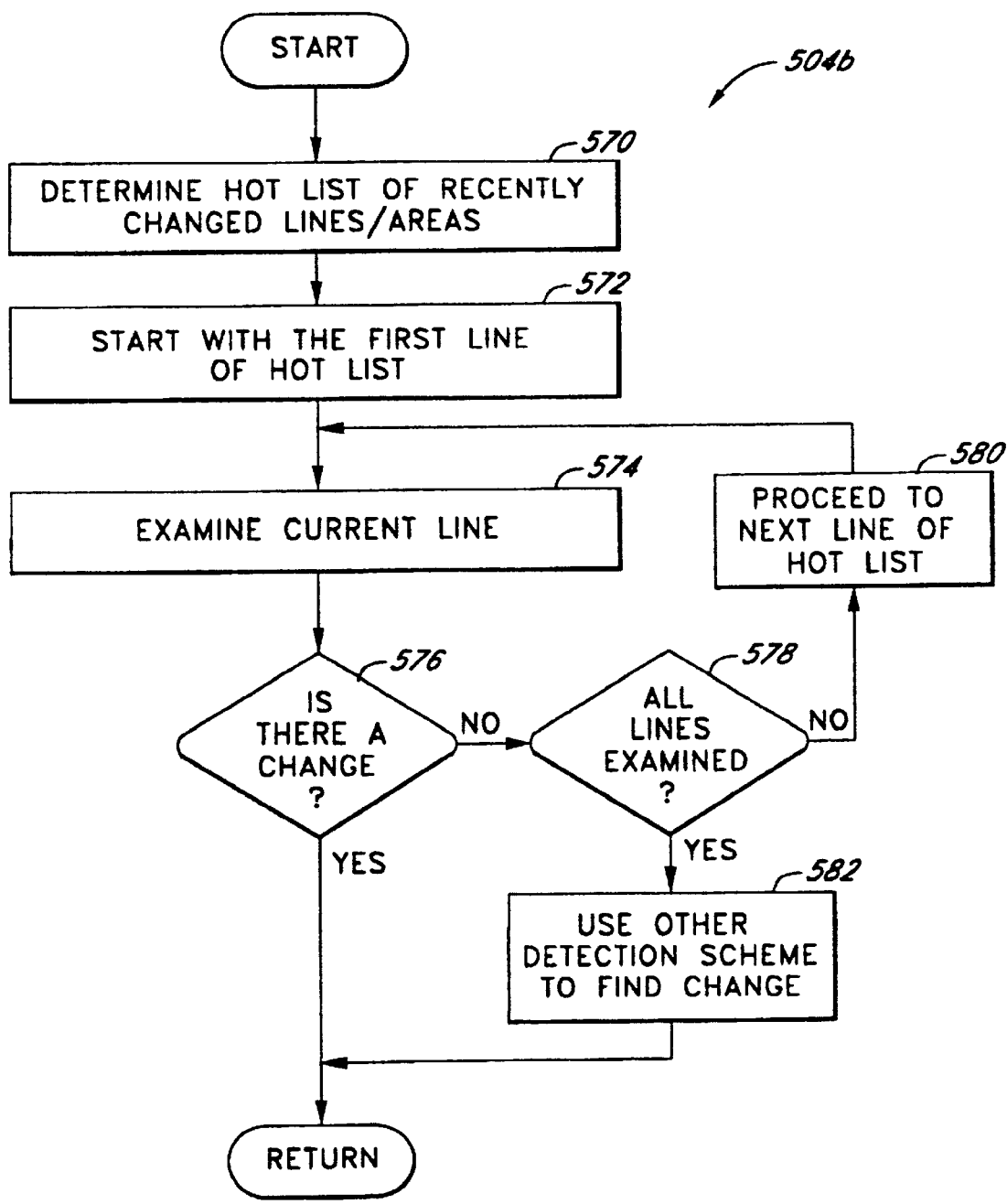
FIG. 7 is a flow chart illustrating a second embodiment of the detection process of the present invention.

FIG. 7 is a flow chart illustrating a second embodiment of the detection process 504 of the present invention. In this embodiment, the detection process 504 is implemented using the hotspot detection technique. Beginning from a start state, the process 504b proceeds to process block 570, where it determines the hot list of the most recently changed lines or areas. Examination commences with the first line of the hot list, as shown in process block 572, and continues with a current line, as shown in process block 574. The process 504b then advances to decision block 576, where it queries if there is a change. If so, the process 504b returns to process block 506 of the main process 500 as shown in FIG. 5, to determine the changed area. Otherwise, the process 504b proceeds to decision block 578, where it queries if all lines on the hot list have been examined. If not, the process 504b advances to process block 580, where it proceeds to examine the next line on the hot list. Otherwise, it proceeds to process block 582, where another detection scheme (such as the process 504a) may be implemented to detect further changes. The process 504b then returns to the main process 500.

As discussed earlier, the detection process 504 may be any one or any combination of the above-described processes 504a and/or 504b. For example, the detection process may proceed by examining the first Mth lines of the display screen using the process 504a, if no changes are found, the process may be followed by examining the second Mth lines of the display screen using the process 504b. Alternatively, the detection process may proceed by examining the desktop using the process 504a when the desktop is first polled, followed by using the process 504b when the desktop is next polled. In addition, any one of these processes may be used in any combination with the input/output device activity detection process as described above.

Figure 8A:
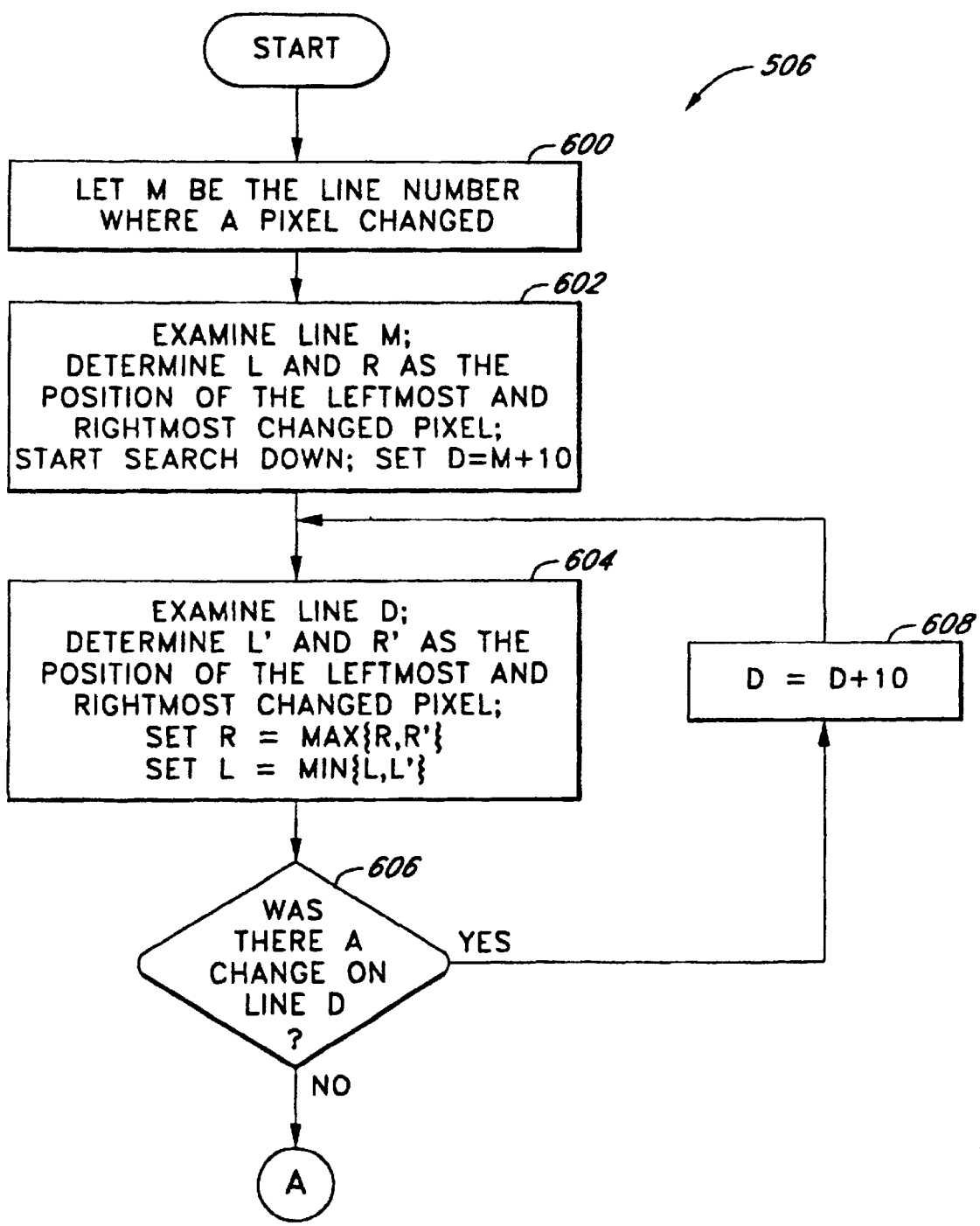
FIGS. 8A and 8B are detailed flow charts illustrating one embodiment of the update extent determination process of the present invention.
Figure 8B:
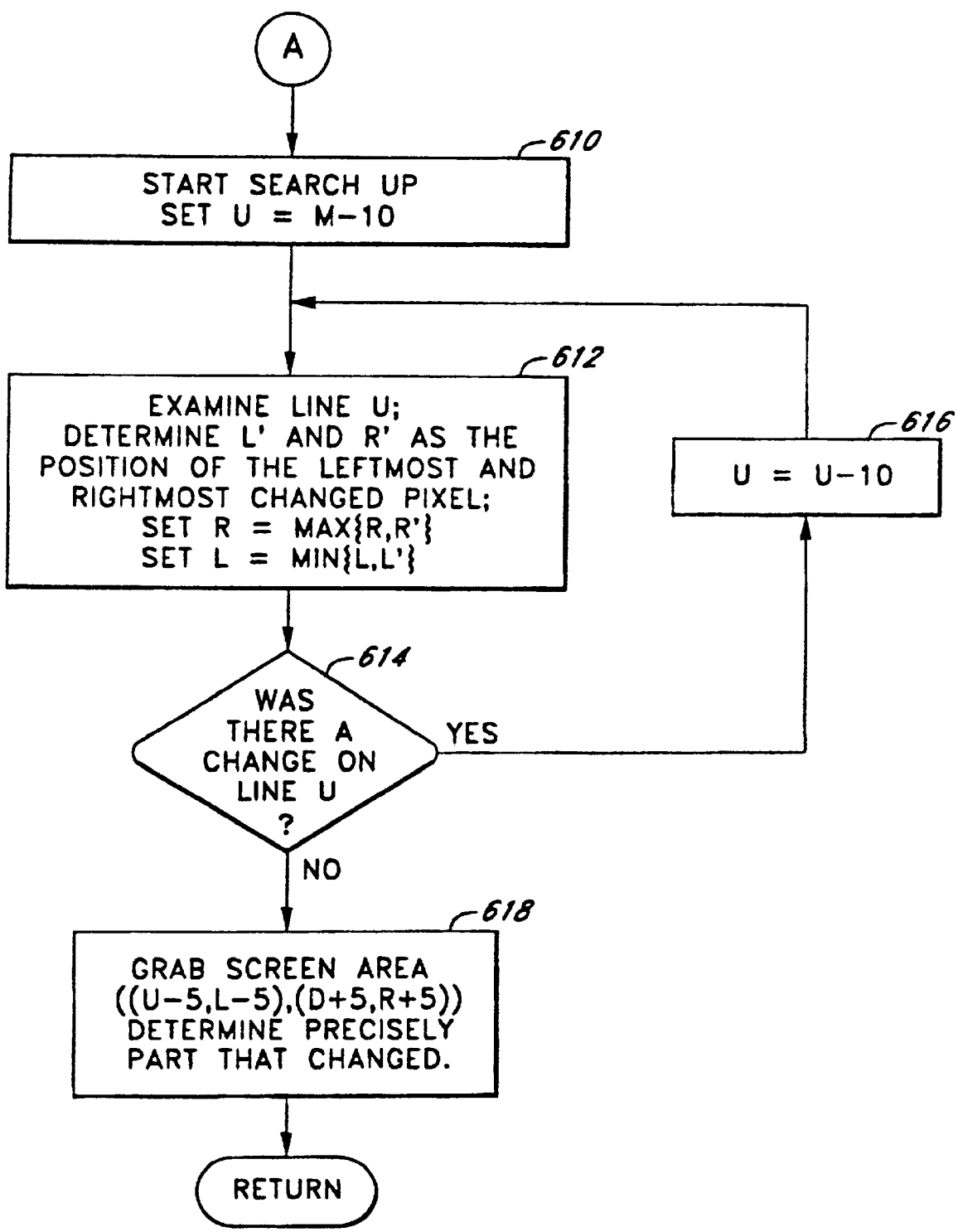

FIGS. 8A and 8B are detailed flowcharts illustrating one embodiment of the process 506 of FIG. 5, which determines the changed area on the display screen. As discussed earlier, the detection processes 504a or 504b may be used to detect changes on the display screen. Once detected, the process 506 efficiently determines the precise area that has changed. This is accomplished in two steps. First, the process 506 probabilistically approximates the area changed by examining the leftmost and the right most change on every tenth line up and down from the currently changed line. Next, it focuses on the area and precisely determines the location of the change.

Beginning from a start state, the process 506 proceeds to process block 600, where the process 506 defines M as the line number in which a pixel has changed. The process 506 then examines line M, and determines the pixels L and R as the leftmost and rightmost pixels that have been changed. The process 506 then proceeds with a search downwards from line M, and sets D=M+10. The process 506 then proceeds to process block 604 where it examines line D, and determines that L' and R' are the leftmost and rightmost pixels that have changed. It then sets R=Max{R,R'} and L=Min{L,L'}.

The process 506 then advances to decision block 606, where it queries if there was a change on line D. If so, the process 506 advances to process block 608, where D is incremented by 10. The process 506 then returns to process block 604. Otherwise, the process 506 advances to process block 610, where it begins to examine the lines above line D by setting U=M−10. The process 506 then proceeds to process block 612, where it examines line U, and determines L' and R' as the positions of the leftmost and rightmost pixels that have changed. It then sets R=Max{R,R'} and L=Min{L, L'}. The process 506 next determines if there was a change on line U, as shown in decision block 614. If so, the process 506 proceeds to process block 616, where U is decreased by 10, and it then returns to process block 612.

At the end of this process 506, the area ((U,L),(D,R)) should include all the changes. However, to ensure that all the changes are included, 5 extra pixels are included. Thus, if there was no change on line U, the process 506 grabs the screen area ((U−5,L−5),(D+5,R+5)) and determines that as the precise area that has changed. The process 506 then returns to process block 508 of the main process 500 as shown in FIG. 5.

In alternate embodiments, the process 506 may be extended by examining an extra line after process blocks 604 and 612, to determine that there are no further changes. In particular, if a change extends up to the border of the estimated area, it is likely that the previously determined area of change is insufficiently accurate. Thus, a larger area may be examined to determine the precise area of change. Otherwise, the missing change(s) will be found during the next search by the detection process 504.

Through the use of the present invention, an apparatus and method for providing efficient remote access, control of remote systems, and updating of display information on remote systems, is provided. The techniques used in detecting changes on the display screen are adaptable to various platforms, are low in complexity, easy to access and involve short processing times.

Although the present invention has been described in terms of certain preferred embodiments, other embodiments apparent to those of ordinary skill in the art are also within the scope of this invention. For example, the processes 500, 504a, 504b, and 506, 600, described above are illustrative and not restrictive. In addition, the processes 500, 504a, 504b and 506 may be implemented separately or in combination. Accordingly, the scope of the invention is intended to be defined only by the claims which follow.

What is claimed is:

1. Adapted to operate on instruction sequences, a processor to examine, at an interval, at least one pixel at a selected location of a currently displayed image by (a.1) determining a non-linear order of examination and (a.2) examining, at the interval, the at least one pixel at the selected location of the currently displayed image, and (b) comparing the selected location with a corresponding location of a previously displayed image to determine a change between the currently display image and the previously display image.

2. The processor of claim 1, wherein the instruction sequences further cause the processor to (c) transmit location information representing the change to a system remotely located from the processor.

3. The processor of claim 2, wherein the instruction sequences further cause the processor to (d) display changed information on the system remotely located from the processor.

4. The processor of claim 1, wherein the determining of the non-linear order of examination comprises:
   listing each line i, where i=0 to N−1, where N is a the total number of lines;
   obtaining the binary representation of each line i;
   reversing the binary representation of each line i;
   determining an order of examination based on the reversed binary representation of each line i.

5. The processor of claim 1, wherein the determining of the non-linear order of examination comprises:
   (a.1.i.) determining an initial order of examination commencing at line X, where X is an integer;
   (a.1.ii.) determining a subsequent order of examination of at least portions of lines (X+K), where K is an integer, based on the initial order of examination.

6. The processor of claim 5, wherein if a previous examination process determines that the previously displayed image has not changed, the processor to repeat (a.1.i.) and (a.1.ii.) using a value of X that is different from that previously selected, and again compare new selected location with a corresponding location of the previously displayed image.

7. The processor of claim 1, wherein the determining of the non-linear order of examination comprises:
   determining a list of most recently changed locations;
   determining an order of examination based on the list.

8. The processor of claim 1, wherein the instruction sequences further cause the processor to further determine an extent of said change by examining a predetermined area surrounding said change and comparing said predetermined area with a previously stored image of said predetermined area.

9. The processor of claim 1, wherein the selected location is any one of a predetermined location, a statistically determined location or an arbitrarily determined location.

10. The processor of claim 1 being implemented within a computer so that the at least one pixel is a plurality of pixels proximate to a current position of a mouse associated with the computer.

11. A program stored in computer readable medium executed by internal circuitry within a system, the program comprising:
(a) a first application program to examine, at an interval, at least one pixel at a selected location of a currently displayed image by (a.1) determining a non-linear order of examination and (a.2) examining the at least one pixel at the selected location of the currently displayed image;
(b) determining a change between the currently displayed image and a previously displayed image; and
(c) a third application program to transmit location information representing the change to the second system.

12. The program of claim 11, wherein the second application program computes a checksum of the selected location and compares the checksum with a computed checksum of a corresponding location of the previously displayed image.

13. The program of claim 12, further comprising a fourth application program to display the information representing the change on the second system.

14. The program of claim 11, wherein the determining of the non-linear order of examination by the first application program comprises:
listing each line i, where i=0 to N−1, where N is the total number of lines;
obtaining the binary representation of each line i;
reversing the binary representation of each line i;
determining an order of examination based on the reversed binary representation of each line i.

15. The program of claim 11, wherein the determining of the non-linear order of examination by the first application program comprises:
(a.1.i.) determining an initial order of examination X, where X is an integer;
(a.1.ii.) determining a subsequent order of examination (X+K), where K is an integer, based on the initial order of examination.

16. The program of claim 11, wherein the determining of the non-linear order of examination by the first application program comprises:
determining a list of most recently changed locations;
determining an order of examination based on the list.

17. The program of claim 11, further comprising a fourth application program to determine an extent of said change by examining a predetermined area surrounding said change and comparing said predetermined area with a previously stored image of said predetermined area.

18. The program of claim 17, further comprising a fifth application program to transmit location information representing said extent of said change and storing the extent of said information representing the change on the second system.

19. A method comprising:
determining an order of examination of selected pixels, comprises:
listing each line i, where i=0 to N−1, where "N" is the total number of lines of the currently displayed image,
obtaining the binary representation of each line i of the currently displayed image,
reversing the binary representation of each line i of the currently displayed image, and
determining an order of examination based on the reversed binary representation of each line i of the currently displayed image;
examining the selected pixels of a subregion of an image currently displayed on a first system by a second system;
comparing the selected pixels with corresponding pixels of a portion of a previously displayed image to determine if the previously displayed image has been changed; and
transmitting information representing a change between the currently displayed image and the previously displayed image from the first system to the second system.

20. A method comprising:
determining an order of examination of selected pixels, comprises:
determining an initial order of examination of the image beginning at line X of the image, where "X" is an integer, and
determining a subsequent order of examination of the image continuing at line (X+AK), where "K" is a fixed integer and "A" is a variable integer;
examining the selected pixels of a subregion of an image currently displayed on a first system by a second system;
comparing the selected pixels with corresponding pixels of a portion of a previously displayed image to determine if the previously displayed image has been changed; and
transmitting information representing a change between the currently displayed image and the previously displayed image from the first system to the second system.

21. The method of claim 20, further comprising:
incrementing the variable integer A if no change between the currently displayed image and the previously displayed image.

22. The method of claim 20 wherein the selected pixels are a plurality of pixels proximate to a current position of a mouse.

23. The method of claim 20 wherein the selected pixels of the subregion form a portion of a line of the image.

24. The method of claim 20 wherein the selected pixels of the subregion form a tile of the image.

* * * * *